United States Patent

Sakashita et al.

[11] Patent Number: 5,323,074
[45] Date of Patent: Jun. 21, 1994

[54] ARMATURE CORE

[75] Inventors: Hiroshi Sakashita; Eiji Arasaki, both of Komagane, Japan

[73] Assignee: Sankyo Seiki Mfg. Co., Ltd., Nagano, Japan

[21] Appl. No.: 883,180

[22] Filed: May 15, 1992

[30] Foreign Application Priority Data

May 20, 1991 [JP] Japan .............................. 3-045065[U]

[51] Int. Cl.$^5$ .............................................. H02K 1/24
[52] U.S. Cl. ........................................ 310/43; 310/269
[58] Field of Search ............... 310/43, 45, 46, 261, 310/264, 269

[56] References Cited

U.S. PATENT DOCUMENTS

| | | | |
|---|---|---|---|
| 4,501,984 | 2/1985 | Mishima | 310/261 |
| 4,529,900 | 7/1985 | Uzuka | 310/43 |
| 5,073,735 | 12/1991 | Takagi | 310/43 |

FOREIGN PATENT DOCUMENTS 64-34851  3/1989  Japan ................................. 310/43

Primary Examiner—Steven L. Stephan
Assistant Examiner—Matthew Nguyen
Attorney, Agent, or Firm—McAulay Fisher Nissen Goldberg & Kiel

[57] ABSTRACT

An armature core comprises a core element made of a magnetic material, wherein the core element has an annular portion. A plurality of salient poles are radially formed on the core element. A plurality of rib portions are formed on the salient poles, respectively; coils are wound around the rib portions. An insulating layer is formed on the surface of the core element. The insulating layer being provided with an area where surface of the core element excludes the insulating layer.

6 Claims, 4 Drawing Sheets

ARMATURE CORE

BACKGROUND OF THE INVENTION a) Field of the Invention

This invention relates to an armature core for use with small-size motors. In particular, the invention relates to an armature core for use with small-size motors having a core element in an annular form that is made of a magnetic material and an insulating layer that is formed on the surface of the core element to prevent incomplete insulation from winding coils. Also formed on the core element are a plurality of salient poles and rib portions that are formed on the salient poles and around which the coils are wound.

b) Background of the Related Art

A method conventionally used to form the insulating layer is by an electrostatic coating process in which a resin powder deposited on the surface of the core element by static electricity is fired so as to consolidate the resin powder by high-frequency heating. An armature core insulated by this method, or which has an insulating layer formed on the surface of the core element, is generally indicated by 51 in FIG. 7. Coils 54 are wound around rib portions 55 formed on a plurality of salient poles, thereby providing a core winding assembly. This core winding assembly is coupled via spacers 52 to a circuit assembly composed of a circuit for driving a small-size motor and a substrate 53 to be equipped with this drive circuit. Thus, the core winding assembly and the circuit assembly combine together to form the stator assembly of the motor.

The spacers 52 are provided between the core winding assembly and the circuit assembly in order to avoid accidental contact between those assemblies that would otherwise occur during the formation of the stator assembly.

The insulating layer of the armature core that is formed by the conventional electrostatic coating process comprises a resin powder deposited by static electricity and suffers from various disadvantages such as surface asperities, uneven thickness and variations in thickness from one lot to another. These phenomena have caused a failure to wind coils in alignment in a subsequent step. Coils are said to be wound in alignment if, as shown in FIG. 4, adjacent turns 3 are wound around rib portions 24 on salient poles without forming any gaps or overlapping with each other.

Unexamined Published Japanese Utility Model Application No. 34851/1989 describes an armature core that comprises laminated core elements and which has an insulating resin layer formed by molding at both an upper and a lower end face in the direction of lamination of those core elements, whereby the salient poles on the core elements are entirely covered with the insulating resin. This technique, however, has had the problem that in the absence of a relief for the resin during its molding, the core elements will be pulled by the resin to experience warpage.

SUMMARY OF THE INVENTION

An object, therefore, of the present invention is to provide an armature core that has an insulating layer of uniform thickness with fewer surface asperities and that is free from warpage in the core element.

Another object of the present invention is to provide an armature core in which the spacers necessary for fixing the circuit assembly, etc. to a core winding assembly comprising coils that are wound around the rib portion formed on each of the salient poles can be formed as an integral part of the insulating layer.

According to an aspect of the present invention, there is provided an armature core which comprises a core element made of a magnetic material, wherein the core element has an annular portion. A plurality of salient poles are radially formed on said core element. A plurality of rib portions are formed on the salient poles, respectively, wherein coils are wound around the rib portions, respectively. An insulating layer is formed on a surface of the core element. The insulating layer is provided with an opening without any insulating material so that warpage of the core element will be avoided.

For a better understanding of the present invention, reference is made to the following description and accompanying drawings while the scope of the invention will be pointed out in the appended claims.

DETAILED DESCRIPTION OF THE PREFERRED EMBODIMENTS

Figure 1:
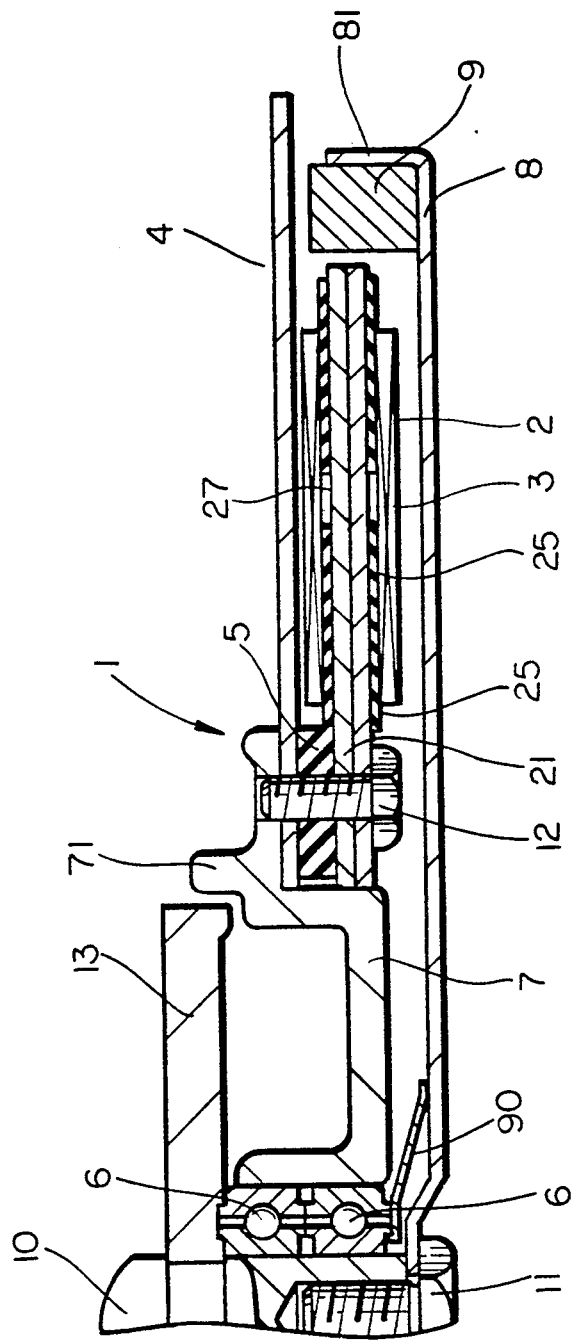
FIG. 1 is a longitudinal section of a spindle motor with which the armature core of the present invention is used.

The construction of the armature core of the present invention is described below in detail with reference to the embodiments shown in accompanying drawings. The first embodiment to be described is such that the armature core is applied to a spindle motor, an example of which is shown in FIG. 1. The spindle motor generally indicated by 1 is composed of a stator assembly and a rotor assembly; the stator assembly comprises a core winding assembly having coils 3 wound around salient poles 23 on the armature core 2 and a substrate 4 as part of the circuit assembly; and the rotor assembly comprises a rotor case 8 containing a rotor magnet 9 and a rotating shaft 10. The substrate 4 and the armature core 2 are secured to the flange portion 71 of a bearing holder 7 by means of screws 12, etc. with spacers 5 interposed. The bearing holder 7 axially supports the rotating shaft 10 via a pair of ball bearings 6. A prepressure spring 90 is disposed between rotor case 8 and one of the ball bearings 6 disposed on a lower portion to apply prepressure force to an inner annular portion of the ball bearing 6. A disc of spindle hub 13 is secured to the output side of the rotating shaft 10 (the top side as viewed in FIG. 1) whereas the rotor case 8 in tray form is secured to the bottom side by means of a screw 11. The rotor magnet 9 of ring shape is fixed to the flange portion 81 of the rotor case 8 in such a way that it is spaced from the inner armature core 2.

The armature core 2 of the present invention is described below with reference to FIG. 2. The core element 21 of the armature core 2 comprises an annular portion 22 that is formed of two laminated thin magnetic sheets, a plurality of salient poles 23 that project radially from the circumference of the annular portion 22 (in FIG. 2, 18 poles are provided), and a rib portion 24 that is formed on each salient pole 23 and around which a coil is to be wound.

Figure 2:
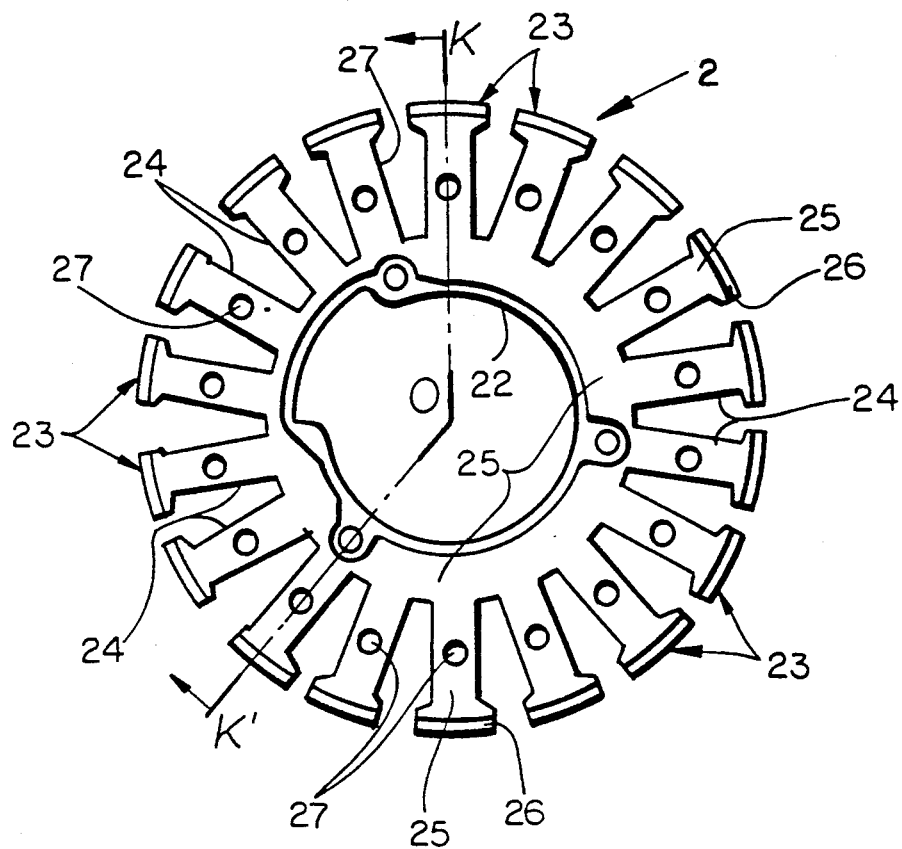
FIG. 2 is a plan view showing an embodiment of the armature core of the present invention.

In order to assure complete insulation from coils 3 around the core element 21, an insulating layer 25 is formed on the surface of the annular portion 22 and on the surface of the rib portion 24 of each salient pole 23 as indicated by the crosshatched areas of FIG. 2. The outer lateral edge of each rib portion 24 is a non-insulated area 26 where no insulating layer is formed. The non-insulated area 26, or the area where the core element 21 is exposed, is located to face the rotor magnet 9, thereby creating a magnetic circuit together with the magnet 9.

A circular non-insulated area 27 having no insulating resin coat is formed in a selected area of the surface of each rib portion 24 having a coat of insulating layer 25 that is at opposite ends of the core element 21 in the direction of lamination and which is substantially in the center of each rib portion 24.

Figure 3:
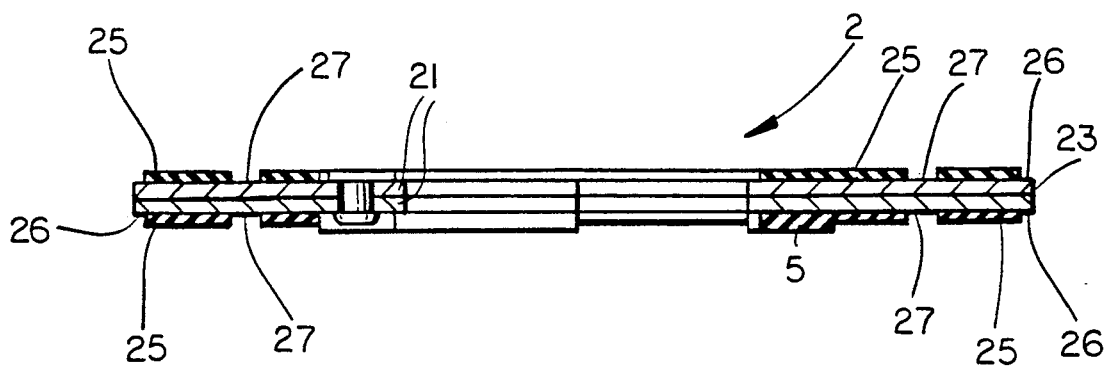
FIG. 3 shows a section of FIG. 2 as taken on line K-O-K'.
Figure 4:
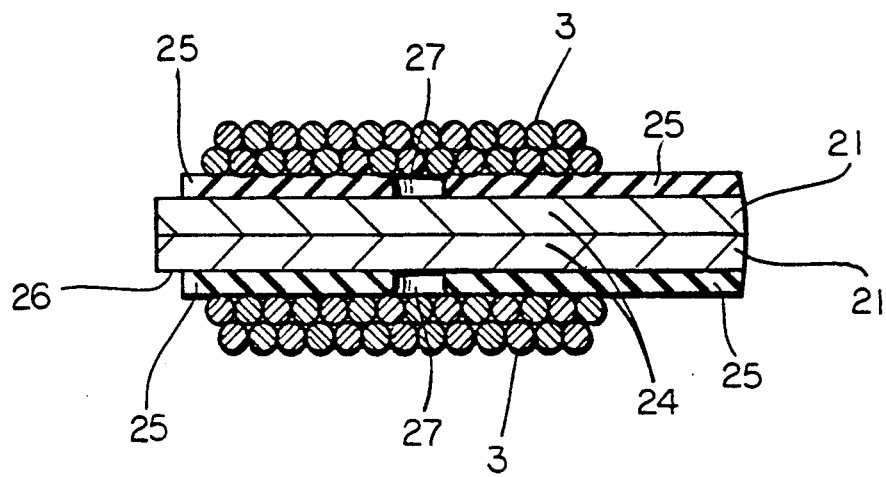
FIG. 4 is a diagram showing how coils are wound in alignment.

FIG. 3 shows a section of the armature core 2 as taken on line K-O-K'. Each of the rib portions 24 of the armature core 2 is covered with an insulating resin on both the top and bottom faces; however, each rib portion 24 has, in its substantially central part, the non-insulated area 27 where no insulating layer is formed, or where the core element 21 is exposed.

Figure 5:
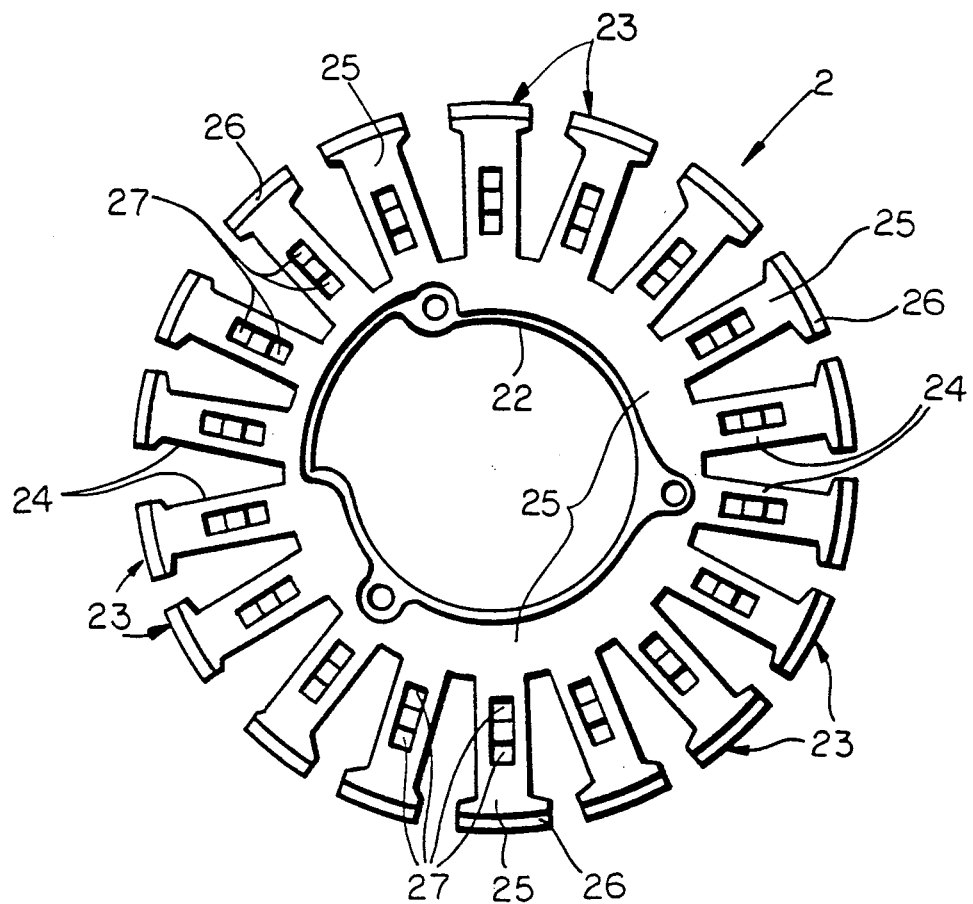
FIG. 5 is a plan view showing another embodiment of the armature core of the present invention.

The insulating layer 25 is formed to prevent incomplete insulation due to contact between the surface of the core element 21 and the winding coils 3. The non-insulated area 27 may be of any shape and size as long as the winding coils 3 will not contact the surface of the core element 21. The non-insulated area 27 is shown to be circular in FIG. 2 but it may be of any other shape such as a rectangle that is elongated in the longitudinal direction of each rib portion 24 as shown in FIG. 5.

In the embodiment described above, the non-insulated area 27 is formed in each rib portion 24 but this is not the only possibility of the present invention and the non-insulated area 27 need not be provided in each rib portion 24 as long as the tensile force due to the formation of the insulating layer 25 can be reduced to the smallest possible level. If desired, the non-insulated area 27 may be formed even in a position other than the rib portion 24 (e.g. near the annular portion 22) as long as the winding coils 3 do not contact the surface of the core element 21.

Figure 6:
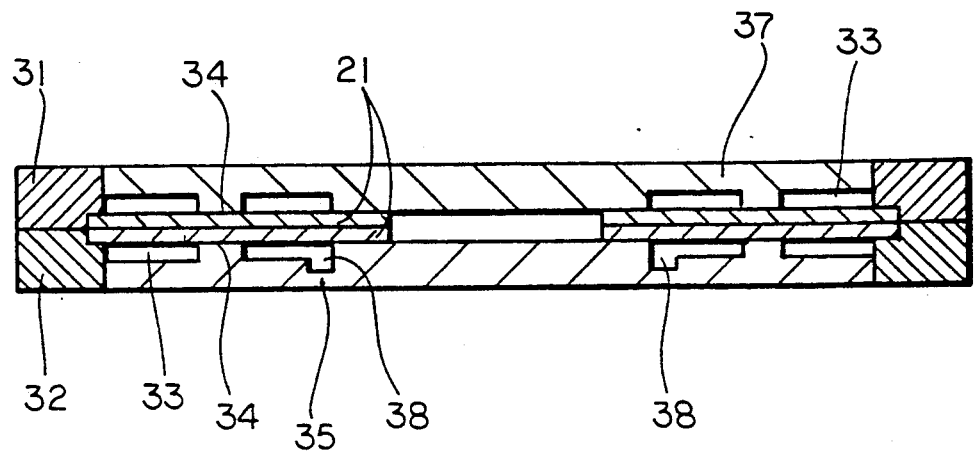
FIG. 6 is a sectional diagram showing a mold for forming the insulating layer on the armature core of the present invention.
Figure 7:
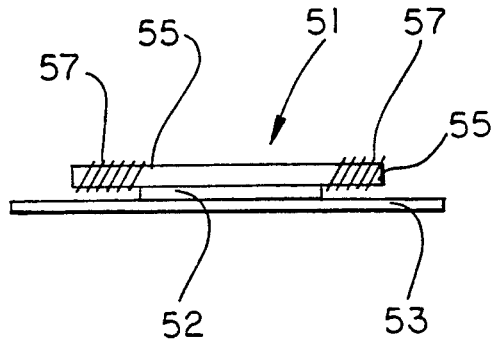
FIG. 7 is a diagram showing a conventional armature core with coils being wound around it to form a core winding assembly.

The method of forming the armature core 2 of the present invention is next described below. As shown in FIG. 6, the core element 21 is composed of two thin magnetic sheets that are placed one on top of the other. As shown in FIG. 3, the two magnetic sheets are fixed together by crimping. The core element 21 is nested in a mold that is composed of four mold parts, an upper outer part 31 that clamps the top face of the circumferential end of the core element 21, a lower outer part 32 that clamps the bottom face of the circumferential end of the core element 21, an upper inner part 37 that clamps from above the inner periphery of the core element 21, and a lower inner part 35 that clamps from below the inner periphery of the core element 21.

The upper and lower inner mold parts 37 and 35 combine with the core element 21 to define those spaces 33 into which an insulating resin is to be injected to form the insulating layer 25. Since these spaces 33 are formed by precise working, the insulating layer that can be formed has fewer surface asperities and a more uniform thickness than what is produced by an electrostatic coating process. Each of the upper and lower inner parts 37 and 35 is provided with projections 34 that extend in such a way that the central area of each rib portion 24 of the core element 21 is depressed from opposite ends (from top and bottom as viewed in FIG. 6).

Thus, with the aid of the four mold parts, the two magnetic sheets forming the core element 21 are clamped together at three points, i.e., the distal end of each salient pole 23, the center of each rib portion 24 and the annular portion 22, whereby those magnetic sheets will closely contact each other without forming any gap and the formation of asperities in the surface of the core element 21 can be minimized.

The projections 34 are provided to form those non-insulated areas 27 at end faces of the core element 21 which are not covered with an insulating resin when it is injected into the mold to form the insulating layer 25.

The lower inner mold part 35 is also provided with recesses 38 on the side facing the annular portion of the core element 21. When a resin is injected into these recesses 38, spacers 5 are formed that are provided on one side of the annular portion 24 facing the circuit assembly in order to avoid accidental contact between the winding coils 3 and the circuit assembly.

Next, an insulating resin which is the material of the insulating layer 25 is injected in liquid form into the mold as the four mold parts are preliminarily heated at a given temperature so as to insure that the insulating resin will flow evenly into every part of the cavity in the mold.

After the injection, the mold is left to stand until the insulating resin sets. Then, the mold is disassembled and the armature core 2 is taken out to be subjected to the next step of winding coils 3 around the rib portions 24.

Being formed by molding in the manner described above, the insulating layer 25 is uniform in thickness and has no surface asperities and, therefore, will not experience any variations in quality between lots. In addition, spacers 5 by way of which the core winding assembly is to be mounted on the substrate 4 which is a component of the circuit assembly are formed as an integral part of the insulating layer on the side facing the circuit assembly, or on the underside as viewed in FIG. 6; this eliminates the need of providing spacers 5 as separate parts and, hence, the costs of producing and assembling them can be saved.

Further, the non-insulated area 27 having no insulation layer is formed in the central part of both the top and bottom sides of the rib portion 24 of each salient pole 23 and this attenuates the tensile force of the insulating resin by a sufficient degree to prevent the warpage or deflection of the core element 21.

In the foregoing embodiments, the concept of the present invention is applied to an armature core having salient poles formed on the circumference of the annular portion of the core element. It should, however, be noted that the same concept is also applicable to an armature core that has salient poles on the inner periphery of the annular portion of the core element. In the embodiments described above, the armature core is assumed to be used with a spindle motor but it may be used with other types of motors.

In accordance with the present invention, an area not covered with an insulating resin is provided at both end faces of the rib portion of each salient pole on the armature core and this attenuates the tensile force of the resin by a sufficient degree to prevent the warpage or deflection of the core element.

In order to form the insulating layer, an insulating resin is injected into a mold having projections that depress the rib portions of the salient poles to form an insulating portion and this is effective in not only enhancing the flatness of the insulating layer but also in reducing its surface asperities. Further, the insulating layer can be worked to have uniform thickness in every part of the core or between lots and, hence, coils can be wound around the rib portions in complete alignment.

In addition, the spacers that are necessary for mounting the core winding assembly on the circuitry assembly etc. are formed as an integral part of the insulating layer and this contributes to a reduction in the costs of producing and assembling spacers as separate parts.

As another advantage, the non-insulated area is formed by compressing together two laminated magnetic sheets of the core element between the projections on the upper and lower inner mold parts in the process of molding the insulating resin to form the insulating layer. As a result, the warpage, deflection or other deformations of the core element can be prevented while avoiding the formation of gaps between the laminated magnetic sheets of the core elements.

While the foregoing description and drawings represent the preferred embodiments of the present invention, it will be obvious to those skilled in the art that various changes and modifications may be made therein without departing from the true spirit and scope of the present invention.

What is claimed is:

1. An armature core comprising:
   a core element made of a magnetic material, said core element having an annular portion;
   a plurality of salient poles radially formed on said core element;
   a plurality of rib portions formed on said salient poles, respectively, coils being wound around said rib portions, respectively; and
   an insulating layer formed on a surface of said core element, said insulating layer being provided with an open area without any insulating material so that warpage of the core element will be avoided, said open area being formed in said rib portion.

2. An armature core as claimed in claim 1, wherein said insulating layer formed on said annular portion has spacers integrally formed on at least one side of said annular portion between said coils wound around said rib portions and a circuit assembly to which said coils are connected to thereby avoid accidental contact between said coils and said circuit assembly.

3. An armature core as claimed in claim 1, wherein said core element includes a plurality of laminated thin magnetic sheets.

4. An armature core as claimed in claim 1, wherein said insulating layer is formed of a resin using a mold.

5. An armature core as claimed in claim 1, wherein said mold has projections formed to depress said rib portions.

6. An armature core according to claim 4, wherein said mold has recesses formed to form spacers that are provided on at least one of said annular portions between said coils wound around said rib portions and said circuit assembly connected to said coil to thereby avoid accidental contact between said coils and said circuit assembly.

* * * * *